United States Patent [19]
Burk et al.

[11] Patent Number: 5,617,506
[45] Date of Patent: Apr. 1, 1997

[54] METHOD FOR COMMUNICATING A VALUE OVER A TRANSMISSION MEDIUM AND FOR DECODING SAME

[75] Inventors: Phil L. Burk, San Rafael; Robert J. Mical, Redwood City; Steven E. Hayes, Half Moon Bay; David C. Platt, Mountain View, all of Calif.

[73] Assignee: The 3DO Company, Redwood City, Calif.

[21] Appl. No.: 267,978

[22] Filed: Jun. 29, 1994

[51] Int. Cl.⁶ .................................. G10L 3/02; G10L 9/00
[52] U.S. Cl. .......................... 395/2.1; 395/2.13; 395/2.2
[58] Field of Search ................................ 395/2.1, 2.13, 395/2.2; 281/29, 30, 33, 34, 35

[56] References Cited

U.S. PATENT DOCUMENTS 5,184,317  2/1993  Pickett .................................... 364/735

OTHER PUBLICATIONS

Davis, P. J., *The Mathematics of Matrices*, 1965, Blaisdell Publishing Co., pp. 125–170.

Yu, T.H. and Mitra, S.K., "A Novel DPCM Algorithm Using A Nonlinear Operator", Jan., 1996, pp. 871–875 IEEE; Conf. on Image Processing.

Schubert, T.J., "Simulation of Effects of Companding," Feb. 1994, IEEE Transactions on Education, pp. 47–50.

*Primary Examiner*—Allen R. MacDonald
*Assistant Examiner*—Indranil Chowdhury
*Attorney, Agent, or Firm*—Fliesler, Dubb, Meyer & Lovejoy

[57] ABSTRACT

A method and apparatus for a 2:1 compression of a digital audio signal including 1) a compression operation for compressing a sixteen bit sample of the audio signal as both an exact value and a delta value, and 2) a regeneration operation for regenerating the compressed exact and delta values once again into a sixteen bit word. The regenerated exact and delta values are then compared against the original sample. Whichever regenerated value most closely matches the original sample has its corresponding compressed value encoded onto a storage medium.

18 Claims, 7 Drawing Sheets

METHOD FOR COMMUNICATING A VALUE OVER A TRANSMISSION MEDIUM AND FOR DECODING SAME

CROSS-REFERENCE TO RELATED APPLICATIONS

The present application is related to the following U.S. patent applications, which applications are owned by assignee of the present application and are hereby incorporated by reference in their entirety.

U.S. Ser. No. 07/970,308 entitled, "AUDIO/VIDEO COMPUTER ARCHITECTURE", by inventors Robert J. Mical et al., filed on Nov. 2, 1992, Attorney Docket No. MDIO4222.

U.S. Ser. No. 08/001,463 entitled, "DIGITAL SIGNAL PROCESSOR ARCHITECTURE", by inventors Donald M. Gray et al., filed on Jan. 6, 1993, Attorney Docket No. MDIO4210.

U.S. Ser. No. 08/001,070 entitled, "EXPANSION BUS", by inventors David L. Needle et al., filed on Jan. 6, 1993, Attorney Docket No. MDIO4280.

BACKGROUND OF THE INVENTION

1. Field of the Invention

The present invention relates to a method and apparatus for compression of a digital audio signal, and in particular to a method and apparatus for compression of a digital audio signal using either a compressed digital sample of the signal or a compressed digital representation of the change of the sample relative to the previous sample, depending on which more closely approximates the uncompressed data sample.

2. Description of the Related Art

Information processing systems often need to both store large amounts of digital data in a mass or dynamic memory device and to transfer a large segment of information in a minimum of time. Several approaches have been developed to meet this need. One such approach is data compression, in which a given segment of digital information is encoded such that it occupies less space in memory. Data compression techniques may be classified as either lossless or lossy processes. Lossless processes are those in which the compressed data may be regenerated exactly as it existed prior to compression, i.e., no data is lost. Such processes are useful for compression of program instructions and textual data, where the entire information content of the data must be preserved. Lossy processes are those in which a certain portion of the perceptibly insignificant input information is irreversibly lost during data compression.

One area where lossy compression processes have proven most valuable is in the storage of audio data for software applications. One reason is that audio data generally requires allocation of a large amount of memory. Thus, in addition to the space taken up on the storage media, it takes a relatively long time to load the data from storage, and, once loaded, the data takes up a lot of space in random access memory where storage space is at a premium. Another reason is that the sound reproduction from compressed audio data can be relatively good without having to preserve the entire information content of the original audio signal. With the current popularity of software applications such as video games, there is presently an industry wide desire to provide an even greater compression ratio of audio data, while at the same time preserving as much of the original signal quality upon regeneration as possible. Moreover, there is a desire to provide a compression and regeneration scheme which may be implemented with a minimum of software programming steps and/or hardware.

One commonly used form of compression of audio signals involves storing "delta" values, rather than absolute values, for each sample. That is, instead of storing the exact value of each sample, only the difference between the current value and the previous value is stored. Since audio signals usually vary slowly, delta values tend to be much smaller than the full absolute sample values and thus can be stored in fewer bits.

The process of looping is another attempt to minimize the amount of data necessary to represent information such as an audio signal. In looping, when a particular segment of an audio signal is to be played repeatedly in succession for an extended period of time, the audio data for the segment may be stored once and the control program merely loops back to the beginning of the segment each time through the loop. However, systems using compressed delta values for looping are particularly susceptible to signal amplitude drift each time through the loop, such that audio quality of the looped signal gradually deteriorates until noticeable distortion occurs. Signal amplitude drift occurs using delta values because, the first time through the loop, the encoded value of starting point would be determined by the sample immediately preceding the loop. However, after the first time through the loop, the encoded value of the starting point would be determined by the last sample in the loop. This dissimilarity in the samples used to determine the starting point generally results in a variance of the starting point each time through the loop, thereby causing the drift. Thus, in addition to maximizing the compression ratio and preserving sound quality, there is a need for a system which can provide compressed audio data which may be looped without signal amplitude drift.

SUMMARY OF THE INVENTION

It is therefore an object of the present invention to provide a method and apparatus for compression of a digital audio signal to increase the amount of data which may be stored on a storage medium and/or within a system dynamic memory.

It is a further object of the present invention to provide a method and apparatus for compression of a digital audio signal to effect a faster transfer of the signal from a storage medium to a system dynamic memory.

It is a still further object of the present invention to provide a method and apparatus for data compression without signal amplitude drift of a looped data sequence.

It is another object of the present invention to provide a method and apparatus which is capable of playing back segment of an audio signal starting with a sample at an arbitrary point in the audio signal without having to access or otherwise make use of the samples prior to the segment.

It is yet another object of the present invention to provide a method and apparatus for compressing a sampled digital audio signal into a first compressed digital value and for compressing a change in the sampled digital audio signal relative to a previous sampled digital audio signal into a second compressed digital value.

It is a still further object of the present invention to provide a method and apparatus for regenerating both the first and second compressed digital values for comparison against the actual sampled digital audio signal.

It is another object of the present invention to optimize the audio quality of an encoded audio signal by selecting onto a storage medium either the first or second compressed digital sample, depending on which more closely approximates the actual digital audio sample.

It is a further object of the present invention to provide a method and apparatus for decoding the encoded compressed digital sample for play back in a destination hardware system.

These and other objects are accomplished by the present invention which relates to a method and apparatus for encoding a digital audio signal onto a storage medium. The encoding process includes a compression operation and a regeneration operation. In one embodiment of the invention, a digital audio signal is sampled and converted into a digital sixteen bit word by an analog-to-digital converter. A particular digital sample is then stored in two forms. The first represents an "exact" value and is the digital sample value of the audio signal at that particular time. The second represents a "delta" value and is the change in the value of the present sample relative to the previous regenerated selected sample.

In a preferred embodiment of the compression operation, a 2:1 data compression is carried out on both the exact and delta digital values to provide a plurality of eight bit data values. The data compression is accomplished by taking the square root (or, more generally, the $n^{th}$ root) of the absolute value of the sixteen bit exact and delta values. If the sample value is negative, the negative sign is carried over to the compressed eight bit representation.

According to an embodiment of the invention, only certain discrete options are available to represent compressed values. When taking the square root of the exact and delta values, it is unlikely that the resultant binary number will be exactly one of these options. Therefore, the software according to the present invention preferably provides two compressed data values for both the exact and delta values; one eight bit binary integer rounded upward from the actual square root, and one eight bit binary integer rounded downward from the actual square root. These four compressed data values, two exact and two delta, represent four "candidates", one of which will be selected for encoding onto the storage medium.

In order to determine which of the four compressed data values is to be selected, the present invention further includes a regeneration operation. In this operation, the four compressed data values are regenerated into sixteen bit words through multiplication of each value with its absolute value. Thus, the compressed data is effectively squared while maintaining the positive or negative aspect of the data. The regenerated data for both the exact and delta data values is next compared to the actual digital sample. The exact data values may be compared as is, but the delta values must be added to the previously selected regenerated value in order to obtain the comparison value. The compressed data value having the regenerated comparison value that most closely matches the actual data is selected and encoded onto the storage medium.

Thus the present invention uses the regenerated data of the instant digital sample for comparison against the actual instant digital sample. In a further embodiment, the present invention may "look ahead" to also compress and then regenerate exact and delta values for the next subsequent digital sample. Comparison of the four regenerated values against the present sample will yield a single regenerated value that is the closest match. However, comparison of the next sample regenerated values against the next sample may indicate that a different selection for the present sample will result in a much better fit of the data to the two samples overall. Therefore, according to this embodiment of the present invention, whichever regenerated value results in the best overall match of the data to both the present and next sample is selected as the proper value for the present sample, and the compressed data value corresponding to that value is encoded onto the disk. In general, a look-ahead of m input samples is possible.

BRIEF DESCRIPTION OF THE DRAWINGS

The invention will now be explained with reference to the Figures in which.

DETAILED DESCRIPTION

The invention will now be described with reference to FIGS. 1–9, which relate in general to apparatus and software for encoding a digital audio signal for storage on a storage medium. While the present invention is described with regard to an audio signal, it is understood that the software according to the present invention may be applied to other areas, including compression of one dimensional digital signals such as for example a digital representation of a video image, medical EKG or EEG traces, sonar and/or telecommunications signals. Additionally, the present invention may operate with any conventional storage medium, including compact disks, floppy disks and tape cartridges. Alternatively, instead of a storage media, the encoded digital audio signal may be transmitted over a communication channel and received within a hardware platform of an end user of the audio data.

It is further understood that the function and result of the software in the present invention may be implemented by means other than software down loaded from a storage medium. For example, as is known in the art, it is contemplated that the software according to the present invention may be resident in a read-only memory, or loaded from another source such as a CD-ROM. Additionally, as is further known in the art, it is understood that the present invention may be carried out by hardwiring the program into hardware within a hardware platform.

Figure 1:
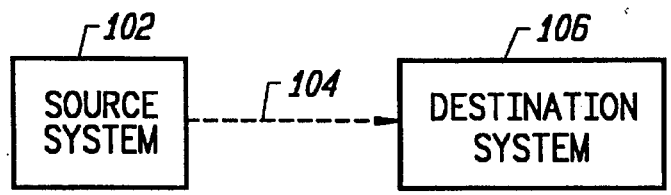
FIG. 1 is a block diagram of the apparatus according to the present invention.

The apparatus for implementing the present invention will now be described with reference to FIGS. 1 and 2. FIG. 1 is an overall block diagram of the apparatus according to the present invention comprising a source system 102, a transmission medium 104, and a destination system 106. The source and destination systems can be computer systems or dedicated hardware units, and the transmission medium 104 can include parts of a cable television network, computer network, radio link, satellite link, data storage medium (such as a compact or floppy disk) which is hand carried from the source system 102 to the destination system 106, or any other medium by which information can be transmitted from a source to a destination. Additionally, although not illustrated in FIG. 1, the invention can be implemented in the manner in which the source and destination are two separately executing processes running on a single computer system, either concurrently or separated in time. In this case the transmission medium 104 might include local volatile memory, a local cache memory, a local bus, and/or a local or network mass storage device.

Figure 2:
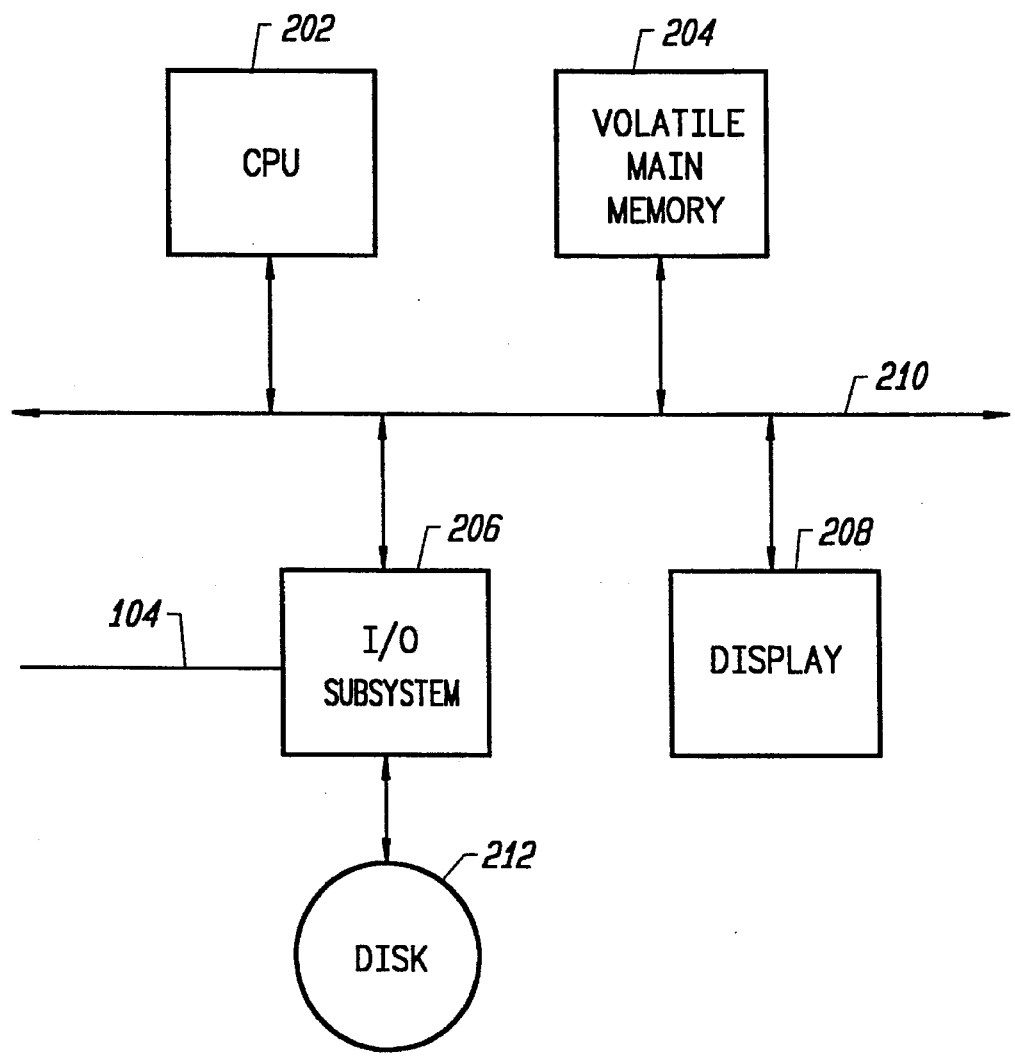
FIG. 2 a block diagram of a computer system for executing the encoding software according to the present invention.

Although no particular hardware platform is required to implement the present invention, FIG. 2 illustrates a possible hardware platform, in this case a computer system platform, which in one embodiment comprises the source system 102 for executing the software according to the invention. A preferred embodiment of the destination system 106 is described in the above-incorporated patent applications, with the compressed data arriving in the destination system 106 via a CD-ROM and read via an expansion bus of the destination system.

The computer system of FIG. 2 comprises a CPU 202, main memory 204, which may be volatile, an I/O subsystem 206, and a display 208, all coupled to a CPU bus 210. The I/O subsystem 206 communicates with peripheral devices such as a disk drive 212. In operation, a computer program implementing aspects of the invention is retrieved from the disk 212 into main memory 204 for execution by the CPU 202. If the system of FIG. 2 represents a source system 102 (FIG. 1), then one or more source signals can be located on the disk drive 212 or provided by an external source (not shown). These signals are retrieved by the CPU 202, running under the control of the computer program. The CPU operating under the control of the computer program processes the signals in the manner set forth herein, and either stores them back on disk 212 or transmits them over the transmission medium 104 (FIG. 1) to the destination system. If the computer system of FIG. 2 represents the destination system 106 (FIG. 1), then it receives the compressed signal or signals over the transmission medium 104, and in accordance with a decompression computer program which the CPU 202 retrieved from the disk 212, decompresses them. Thereafter, the signal is converted to an analog audio signal through a digital-to-audio converter, and played through audio components (not shown) provided as part of destination system 106.

Figure 3:
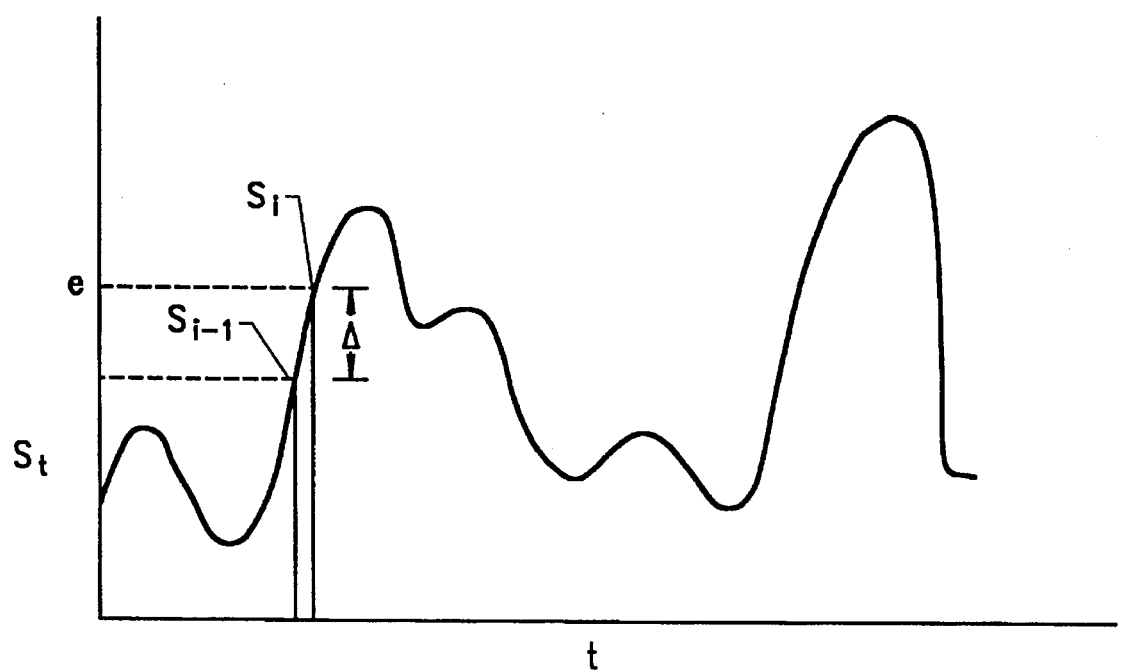
FIG. 3 is a graph of a possible audio signal to be encoded according to the present invention.

The software according to the present invention will now be described with reference to FIGS. 3–7. Shown in FIG. 3 is a graphic representation of an audio signal, $S_i$. As is known in the art, the analog signal may be sampled at discrete time intervals, and converted into digital signals that may be manipulated by the hardware platform describe above. In a preferred embodiment, the converted signals may be electrical signals having a voltage which, when above a predefined threshold represent a logic 1, and which, when below a predefined threshold represent a logic 0. The electrical signals representing a value may be carried on several conductors (for example, if the value is represented in binary), and thus the electrical signals representing such a value may comprise a group of electrical signals. At times the signals are stored in the state of a flip-flop, latch, capacitance or other storage circuit in the systems 102 and 106 (FIG. 1). The analog signal may be converted into the electrical signals by a conventional analog-to-digital converter.

Figure 5:
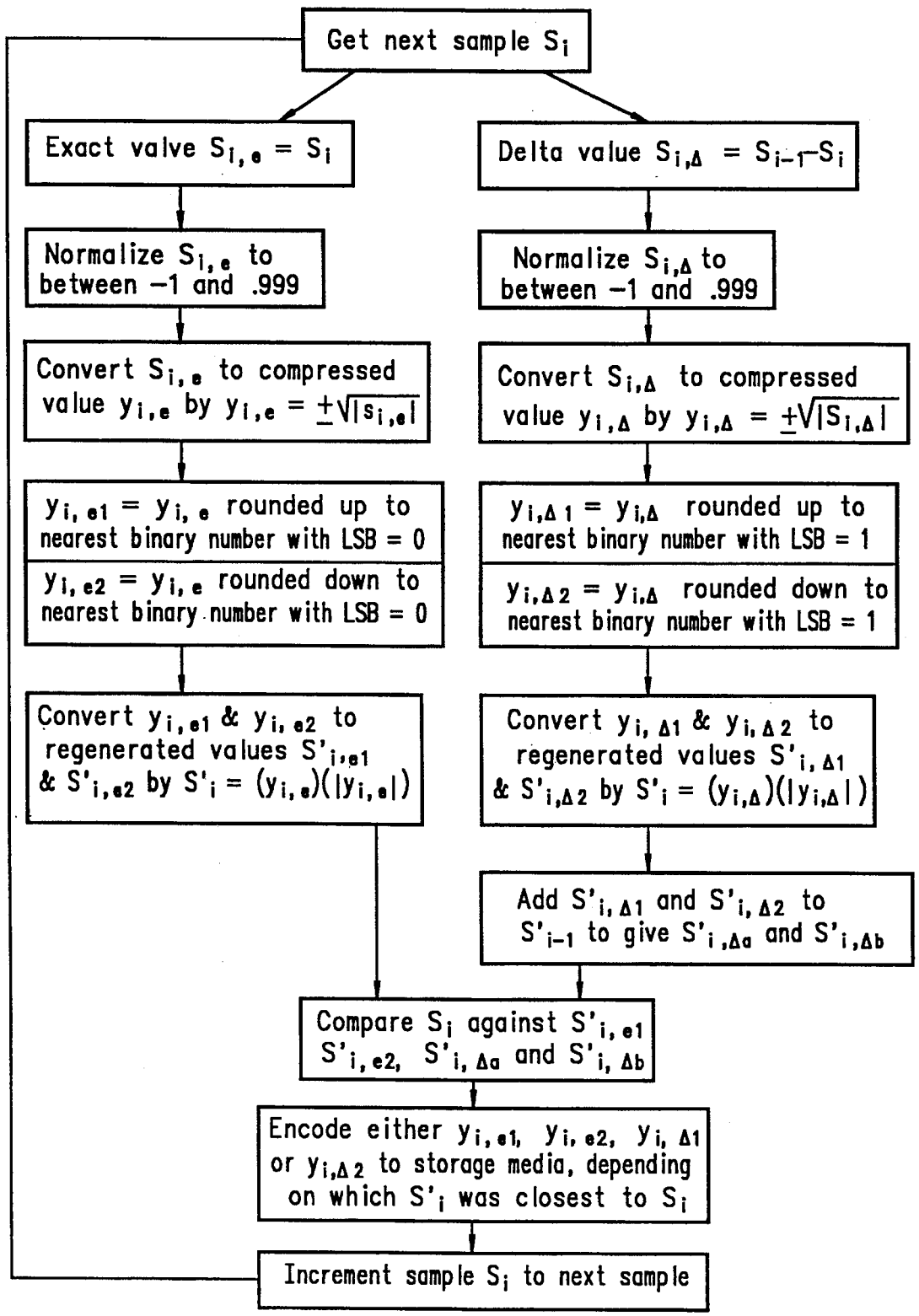
FIG. 5 is a flow chart showing the compression and regeneration operations according to the present invention.

As shown on the flow chart of FIG. 5, during the encoding process, the software according to the present invention identifies and stores a particular sample, or starting value, $s_i$, two ways. The first is to store the actual or exact value, $s_{i,e}$, of the sample in a sixteen bit register. In addition, a particular sample $s_i$ is stored in the sixteen bit register as the change in its value relative to the previous sample obtained for encoding, such that the delta value, $s_{i,\Delta}$, is given by:

$$s_{i,\Delta} = s'_{i-1} - s_i,$$

where $s'_{i-1}$ represents the sixteen bit value whose compressed value has been selected for encoding onto the storage medium at time t−1. As explained below, both the exact and delta values are compressed, and one is selected for encoding onto a storage medium, depending on which compressed value more closely reproduces the actual audio sample $s_i$ upon regeneration. The convention $s'_i$ shall be used herein to refer to a digital sample $s_i$ that has been compressed and regenerated as explained below.

In a preferred embodiment, each digital representation of the exact and delta values, $s_{i,e}$, $s_{i,\Delta}$, is stored in a sixteen bit word. The software according to the present invention includes a compression operation for compressing each of the exact and delta values into eight bit data values. Thus, in reducing the sixteen bit values into eight bit values, a 2:1 data compression is accomplished. It is understood that in alternative embodiments, more or less than sixteen bits may be allocated for storage of the original exact and/or delta values. Similarly, more or less than eight bits may be allocated for storage of the compressed data values.

In the compression operation, the digital representation of the exact and delta values are compressed from sixteen bit words to eight bit data values by taking the square root of the absolute value of the sixteen bit digital value. Thus, in a preferred embodiment, the compressed data values, or transmission values, $y_i$, are obtained by:

$$y_{i,e} = \pm (|s_{i,e}|)^{1/2}, \text{ and}$$

$$y_{i,\Delta} = \pm (|s_{i,\Delta}|)^{1/2},$$

As the original exact and delta values may be negative or positive, the square root function is performed on the absolute value of the data, and then the positive or negative sign of the data is carried over to the compressed data value. As will be appreciated by those skilled in the art, the description of mathematical functions herein, such as taking the square root and carrying over a positive or negative sign, is merely a shorthand description of both the mathematical process and the steps performed by the circuitry of receiving data, manipulating the data and generating output data.

A feature of the present invention is that the compressed exact values are distinguished from compressed delta values by the contents of the low order bit (LSB) of the compressed data value. In a preferred embodiment of the present invention, if the square root function described above is performed on an exact value $s_{i,e}$, then the resulting compressed exact value is limited to all those eight bit numbers having a "0" as the LSB. Similarly, if the square root function described above is performed on a delta value $s_{i,\Delta}$, then the resulting compressed delta value is limited to all those eight bit numbers having a "1" as the LSB.

Of course, when the square root function is performed on an exact value $s_{i,e}$, it is unlikely that the resulting number will exactly fall on a binary integer with an LSB of 0. The same is true that it is unlikely that the square root of the delta value $s_{i,\Delta}$ will exactly fall on a binary integer with an LSB of 1. Therefore, in a preferred embodiment, the software according to the present invention preferably provides two compressed data values for both the exact and delta values; one eight bit binary integer rounded upward from the actual square root to the nearest binary number with the correct LSB, and one eight bit binary integer rounded downward from the actual square root to the nearest binary number with the correct LSB. Therefore, after taking the square root and rounding the square root upwards and downwards to the nearest binary number with the correct LSB, a plurality of compressed data values, $y_i$, are obtained. In a preferred embodiment, there will be four compressed data values $y_i$: two compressed exact values, $y_{i,e1}$, $y_{i,e2}$, (chosen from the eight bit integers with LSBs=0), and two compressed delta values, $y_{i,\Delta 1}$, $y_{i,\Delta 2}$, (chosen from the eight bit integers with LSBs=1).

These four compressed data values $y_i$ represent four candidates for selection, one of which will be encoded onto the storage medium as the data representing $s_i$. As explained in greater detail below, the value $y_i$ to be selected for encoding is determined by which value $y_i$ regenerates into a value $s'_i$ that most closely matches the original sample $s_i$. For the regeneration operation described hereinafter, the contents of the LSB will determine if the regenerated value is compared against $s_i$ as is, or whether the regenerated value is added to the previous selected regenerated value for comparison against $s_i$. For the decoding operation described hereinafter, the contents of the LSB will determine if the decoded value is used as is, or whether the decoded value is added to the previous selected regenerated value for use as the audio data sample.

In the rounding processes described above, the correct values both above and below the square root are selected to thereby yield four compressed data values. In an alternative embodiment of the present invention, the binary numbers obtained from the square root of both the exact and delta values may be rounded only to the nearest binary integers having the correct LSB, thereby yielding only two compressed data candidates for selection onto the storage media, $y_{i,e}$ and $y_{i,\Delta}$. Alternatively, in addition to obtaining the two nearest data candidates, the next higher and lower compressed data values having correct LSBs may also be chosen as potential candidates. Thus, in this embodiment, there are six compressed data values as candidates for selection onto the storage medium, $y_{i,e1}$, $y_{i,e2}$, $y_{i,e3}$, $y_{i,\Delta 1}$, $y_{i,\Delta 2}$, and $y_{i,\Delta 3}$.

Once the compressed data values have been obtained as potential candidates for encoding onto the storage medium, they must be regenerated into sixteen bit words $s'_i$ for comparison against the actual sample $s_i$. Therefore, the present invention further includes a regeneration operation for regenerating the compressed data values. In the regeneration operation, a compressed data value $y_i$ is converted from an eight bit value to a sixteen bit word by multiplying the value $y_i$ by its absolute value. Thus, regenerated values $s'_i$ are given by:

$$s'_{i,e1} = y_{i,e1} * |y_{i,e1}|$$

$$s'_{i,e2} = y_{i,e2} * |y_{i,e2}|$$

$$s'_{i,\Delta 1} = y_{i,\Delta 1} * |y_{i,\Delta 1}|$$

$$s'_{i,\Delta 2} = y_{i,\Delta 2} * |y_{i,\Delta 2}|$$

The compressed data is effectively squared while maintaining the positive or negative aspect of the data.

The regenerated exact values, $s'_{i,e1}$ and $s'_{i,e2}$ are ready for comparison against the actual sample $s_i$. However, the regenerated delta values represent only the change relative to the previous value selected for encoding, and must first be added to the previous selected value. Therefore, the regenerated delta values, $s'_{i,\Delta a}$ and $s'_{i,\Delta b}$, to be used for comparison are given by:

$$s'_{i,\Delta a} = s'_{i-1} + s'_{i,\Delta 1}$$

$$s'_{i,\Delta b} = s'_{i-1} + s'_{i,\Delta 2},$$

where $s'_{i-1}$ is the value that most closely matched $s_{i-1}$.

Once obtained, each of the sixteen bit regenerated values, $s'_{i,e1}$, $s'_{i,e2}$, $s'_{i,\Delta a}$ and $s'_{i,\Delta b}$, is compared against the actual digital sample $s_i$. When the regenerated value which matches, or most closely matches, the sample $s_i$ is identified, the compressed data value from which that match was obtained is selected for encoding onto the storage medium. The next sample $s_i$, formerly $s_{i+1}$, is input and the compression and regeneration operations according to the above-described routine are repeated. This encoding process continues until the entire digital audio signal is encoded onto the storage medium.

The eight bit compressed data values will range from a maximum of 127 to a minimum of −128. As shown on the x-axis of FIG. 4, these numbers may be represented as fractions, with −1.0 representing the minimum value of −128 and 0.992 (127/128) representing the maximum value of 127, with all other values falling proportionately therebetween. Similarly, the sixteen bit sample $s_i$ or a regenerated value $s'_i$ will range from a maximum of 32,767 and a minimum of −32,768. As shown on the y-axis of FIG. 4, these numbers may also be represented as fractions, with −1.0 representing the minimum value of −32,768 and 0.999 representing the maximum value of 32,767, with all other values falling proportionately therebetween. The advantage to using fractions in conjunction with the squaring and square root functions described above is that performing these functions on any fraction between −1.0 and 0.999 will always result in a fraction between −1.0 and 0.999. Thus, any value resulting from the square root and square functions according to the present invention may be held in the designated eight bit and sixteen bit registers without overflow. There is an exception, which is handled by the software according to the present invention, when a compressed data value is equal to −1.0. When put through the squaring function, the absolute value of −1.0 is 1.0. However, use of 1.0 will result in overflow and an anomalous result. Therefore, if any compressed data value $y_i$ is equal to −1.0, this value is eliminated as a possible candidate for selection.

Figure 4:
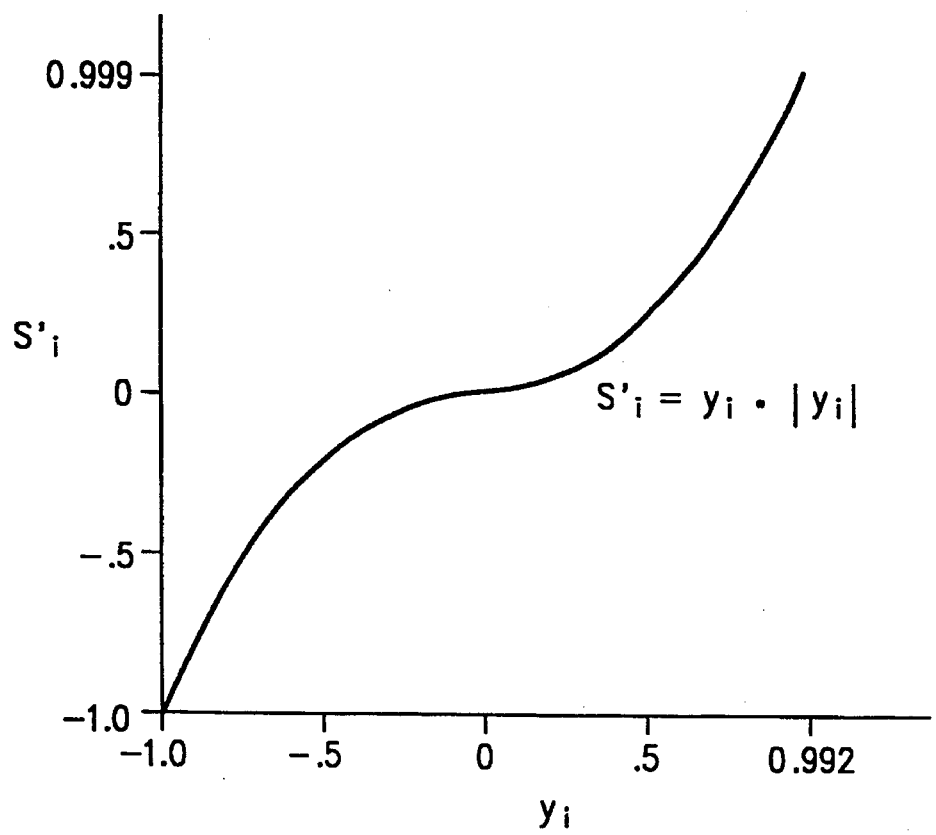
FIG. 4 is a graph of y=x*|x|.

A further advantage of using the squaring function to regenerate the values $s'_i$, as shown in FIG. 4, is that while there will be some large samples $s_i$, the majority of actual samples cluster around 0. Similarly, the regenerated outputs of the squaring function, $s'_i$, similarly cluster around 0. Therefore the distribution of regenerated values closely matches the distribution of the actual samples and there is a high resolution around 0 where most of the regenerated values lie. A still further advantage of the squaring function is that the DSP 806, described in the incorporated applications, is particularly suited to performing multiplications, and may implement the squaring function in a quick and efficient manner. Thus, in comparison to conventional look-up tables often used to regenerate compressed data, the squaring function according to the present invention may be quicker, but does not require the same amount of space in memory needed to store the look-up table.

While the above-described compression and regeneration operations have involved square root and squaring steps, respectively, it is understood that the exponent by which the data is compressed and regenerated may vary in alternative embodiments, with the limitation that the exponent used in the regeneration operation must be the inverse of the exponent used in the compression operation. Therefore, for example, in a further embodiment of the present invention, the compression operation may involve taking the cube root of the exact and delta values, and the regeneration operation may involve cubing the compressed exact and delta values. In the compression operation described above involving the square root of the exact and delta values, the square root was taken of the absolute value of the data. This is done because when a number is raised to the exponent of 1/n, where n is even, the number cannot be negative. Similarly, in the regeneration operation described above involving squaring the compressed data values, the data was multiplied by the absolute value of itself. This is done because raising a negative numeral to an even exponent removes the negative aspect of the number. However, the same does not apply to odd exponents and, as will be appreciated by those in the art, when the data is raised to the exponent of n or 1/n, where n is an odd number, the compression and regeneration operations do not involve the use of absolute values.

In a preferred embodiment, there are certain data samples $s_i$ for which a comparison between the compressed exact and delta values is not carried out. For example, the first sample from a digital audio signal obviously cannot be obtained using delta values as there is no previous sample to measure against. Moreover, as explained in the Background of the Invention, looping is often used to repeat a segment of an audio signal with a minimum of data. If the starting point of the loop were selected using delta values, the first time through the loop, the encoded value of starting point would be determined by the sample immediately preceding the loop. However, after the first time through the loop, the encoded value of the starting point would be determined by the last sample in the loop. As the sample preceding the loop may be dissimilar to the last sample in the loop, the encoded value of the starting point in the loop may vary the second time through the loop. This variance in the starting point in the loop would be compounded each time through the loop thereafter, and amplitude signal drift would occur.

Therefore, for the starting sample of the audio signal or a loop, the software according to the present invention may limit the candidates for selection onto the storage medium to only the compressed exact values. In this way, the starting point of a loop is reset to the same value each time. The present invention may additionally limit the candidates for selection onto the storage medium to only the compressed exact values when the delta value $s_{i,\Delta}$ for a given sample is large, i.e., there is a large difference in the value of the present sample $s_i$ relative to the previous sample $s_{i-1}$. This is so because in calculating an initial delta value $s_{i,\Delta}$ by subtracting the present sample $s_i$ from the previous sample obtained for encoding $s'_{i-1}$, the absolute value of the difference may be greater than 0.999. This will result in overflow and distortion of the encoded sample. Therefore, in a preferred embodiment, if the absolute value of the difference in value between $s_i$ and $s'_{i-1}$ is greater than 0.999, then only the compressed exact values are used. However, the delta value above which only compressed exact values are used may vary in alternative embodiments.

When the candidates are limited to the compressed exact values, there still may be two exact candidates obtained as previously described, with the one most closely matching the actual sample being selected for encoding onto the storage medium. Similarly, in alternative embodiments, there may be one or three compressed exact value candidates obtained as previously described.

Figure 6A:
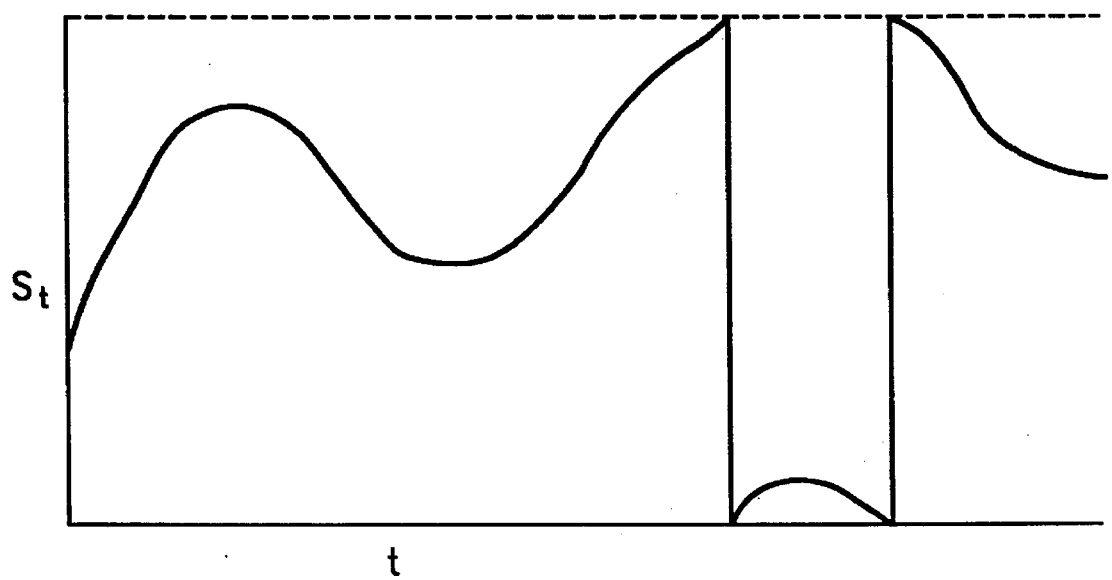
FIG. 6A is graph of the regenerated audio signal without clipping.
Figure 6B:
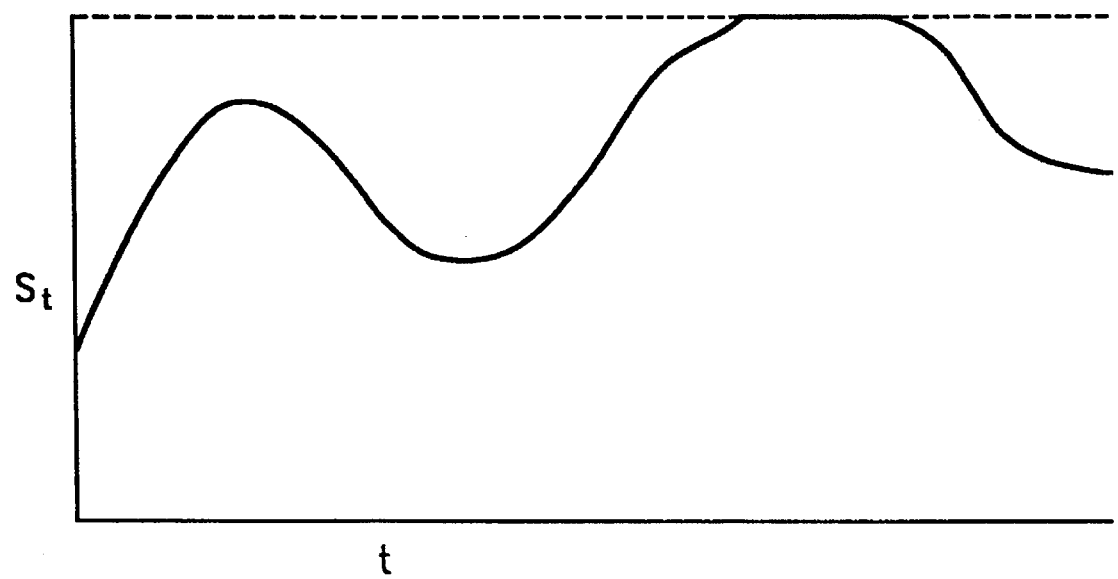
FIG. 6B is graph of the regenerated audio signal with clipping.
Figure 7:
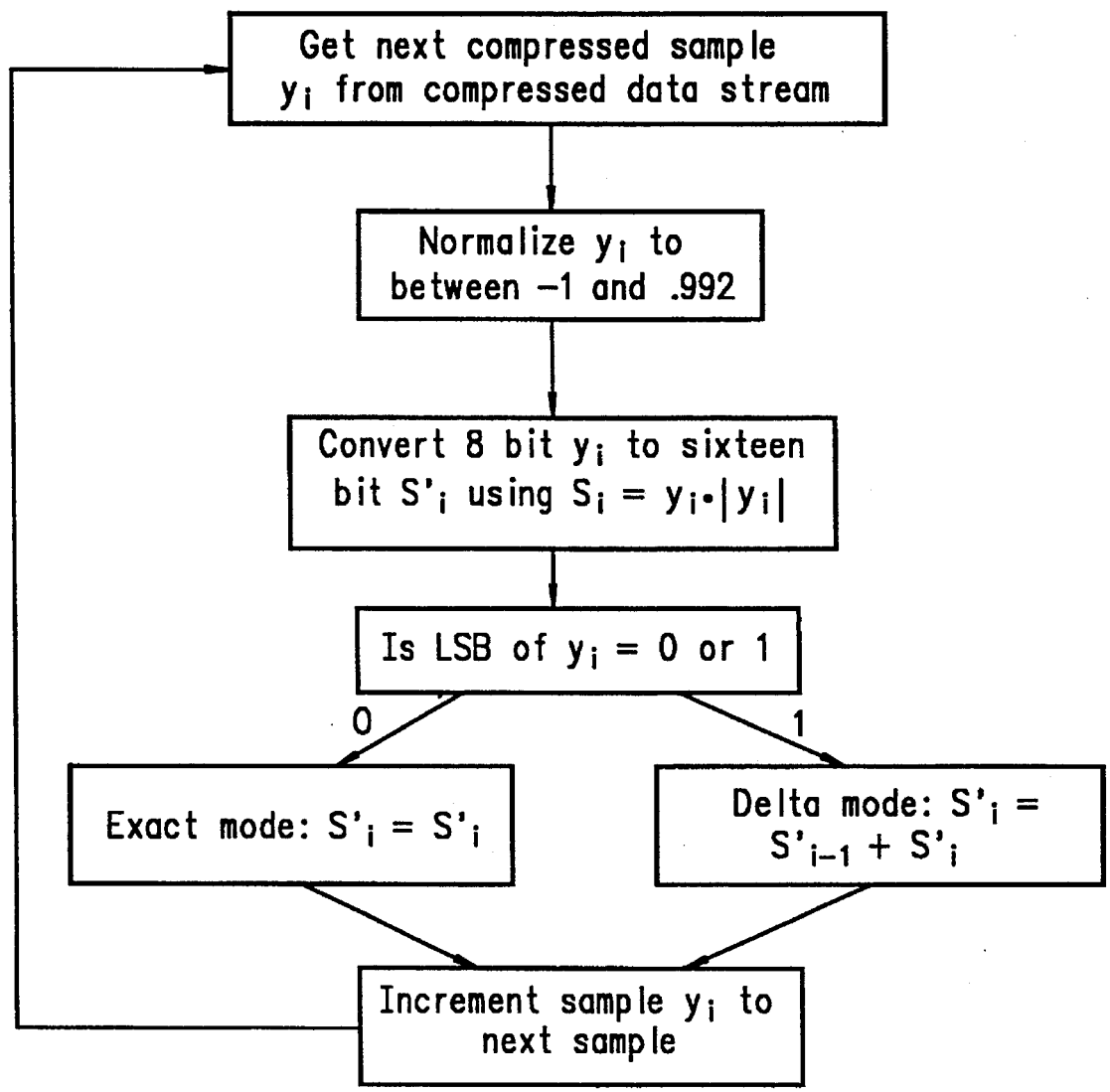
FIG. 7 is flow chart of the decoding operation using the compressed data according to the present invention.

The software according to the present invention may further include a "clipping" feature when performing the addition of the regenerated delta values $s'_{i,\Delta 1}$, $s'_{i,\Delta 2}$ to the previous selected regenerated sample $s'_i$. This addition may result in a number greater than 0.999 or less than −1.0, thus resulting in digital overflow. An overflow will result in a reproduced audio signal that includes a spike as shown on FIG. 6A (here, an overflow above 0.999) and will produce a noticeable flaw when the audio signal is played. Therefore, the clipping feature of the software is provided to prevent such overflow. When an overflow above 0.999 is detected by the condition codes in the ALU 820 of the processor 806 (described below), the regenerated value is set to 0.999. Similarly, when an overflow below −1.0 is detected, the regenerated value is set to −1.0. The result is a reproduced audio signal as shown in FIG. 6B (shown here for a potential overflow above 0.999).

In an alternative embodiment of the present invention, in addition to using instant sample $s_i$ to determine the proper compressed data value for selection, the software according to the present invention may "look ahead" and use both the sample $s_i$ and the next sample $s_{i+1}$ to determine the proper compressed data value for selection.

In this embodiment, the two compressed exact values $y_{i,e1}$, $y_{i,e2}$ and the two compressed delta values $y_{i,\Delta 1}$, $y_{i,\Delta 2}$ are obtained by the compression operation for the present sample $s_i$ as described above. Thereafter, the compressed exact and delta values for $s_i$ are regenerated by the regeneration operation described above to yield the regeneration values $s'_{i,e1}$, $s'_{i,e2}$, $s'_{i,\Delta a}$, and $s'_{i,\Delta b}$. The regenerated exact values $s'_{i,e1}$, $s'_{i,e2}$, may be compared as is against the actual sample. However, as described above, the regenerated delta values $s'_{i,\Delta a}$, $s'_{i,\Delta b}$, must be added to the previous selected regenerated sample $s'_{i-1}$, such that:

$$s'_{i,\Delta a} = s'_{i-1} + s'_{i,\Delta 1},$$

and $$s'_{i,\Delta b} = s'_{i-1} + s'_{i,\Delta 2}.$$

$s'_{i,\Delta a}$ and $s'_{i,\Delta a}$ may then be compared against the actual sample.

Thereafter, this embodiment "looks ahead" to calculate what the regenerated values would be at a time t+1 using each of the regenerated values obtained at time t. Thus, the two regenerated exact values and the two regenerated delta values are obtained for time t+1, through the compression and regeneration operations described above, for each of the regenerated values obtained at time t. The regenerated exact values at time t+1 will not be affected by the regenerated values at time t. Similarly, the regenerated exact values at time t+1 will not affect the selection of the appropriate compressed value at time t. However, the regenerated delta values at time t+1 must be added to the regenerated values from time t, and each of the regenerated values at time t are likely to be different. Therefore, each of the regenerated delta values at time t+1 are likely to be different. The regenerated values $s'_{i+1,e1}$, $s'_{i+1,e2}$, $s'_{i+1,\Delta a}$, $s'_{i+1,\Delta b}$ at time t+1 are given as follows:

For $y_{i,e1}$ selected at time t:

$$s'_{i+1,e1}$$

$$s'_{i+1,e2}$$

$$s'_{i+1,\Delta a} = s'_{i,e1} + s'_{i+1,\Delta 1}$$

$$s'_{i+1,\Delta b} = s'_{i,e1} + s'_{i+1,\Delta 2}$$

For $y_{i,e2}$ selected at time t:

$$s'_{i+1,e1}$$

$$s'_{i+1,e2}$$

$$s'_{i+1,\Delta a} = s'_{i,e2} + s'_{i+1,\Delta 1}$$

$$s'_{i+1,\Delta b} = s'_{i,e2} + s'_{i+1,\Delta 2}$$

For $y_{i,\Delta 1}$ selected at time t:

$$s'_{i+1,e1}$$

$$s'_{i+1,e2}$$

$$s'_{i+1,\Delta a} = s'_{i,\Delta a} + s'_{i+1,\Delta 1}$$

$$s'_{i+1,\Delta b} = s'_{i,\Delta a} + s'_{i+1,\Delta 2}$$

For $y_{i,\Delta 2}$ selected at time t:

$$s'_{i+1,e1}$$

$$s'_{i+1,e2}$$

$$s'_{i+1,\Delta a} = s'_{i,\Delta b} + s'_{i+1,\Delta 1}$$

$$s'_{i+1,\Delta b} = s'_{i,\Delta b} + s'_{i+1,\Delta 2}$$

Thus, in this embodiment of the present invention, there are twenty regenerated values used for comparison against the actual samples; four to be compared against the actual present sample $s_i$, and sixteen to be compared against the actual next sample $s_{i+1}$. Comparison of the four regenerated values $s'_{i,e1}$, $s'_{i,e2}$, $s'_{i,\Delta a}$, $s'_{i,\Delta b}$ against sample $s_i$ yields a single regenerated value that is the closest match to $s_i$. However, comparison of the sixteen regenerated values against sample $s_{i+1}$ may indicate that a different selection for $s_i$ will result in a much better fit of the data to the samples $s_i$ and $s_{i+1}$ overall. Therefore, according to this embodiment of the present invention, whichever value $s_{i,e1}$, $s_{i,e2}$, $s_{i,\Delta a}$, $s_{i,\Delta b}$ will result in the overall best match of the data to both $s_i$ and $s_{i+1}$ is selected as the proper value for $s_i$, and the compressed data value $y_i$ from which that value was obtained is encoded onto the storage medium. In order to determine this, the deviation of a given value $s'_i$ from $s_i$ is squared and the deviations of the values $s'_{i+1}$ from $s_{i+1}$ with that given value selected at $s_i$ are squared. Each of the squared deviations are then summed. Whichever value $s_{i,e1}$, $s_{i,e2}$, $s_{i,\Delta a}$, $s_{i,\Delta b}$ results in the lowest summation for samples $s_i$ and $s_{i+1}$ together is the best overall match. As opposed to looking ahead only to the next sample, in further embodiments of the present invention, the above described method of selection of the appropriate compressed data value for $s_i$ could be applied so as to consider any number of subsequent samples in addition to the present sample. Moreover, it is understood that other methods may be used to determine the best match of a regenerated value $s'_i$ to $s_i$, or $s'_i$ and $s'_{i+1}$ to $s_i$ and $s_{i+1}$.

The description of encoding of an audio signal up to this point has related entirely to operations carried out in the source system 102 shown in FIGS. 1 and 2, typically by the audio software supplier who encodes the audio data onto a storage medium. Once the data has been encoded on the storage medium, it may thereafter be transmitted to an end user of the audio software on the end user's hardware platform 106. The data may be decoded according to a decoding algorithm also written onto the storage medium, which algorithm is loaded onto the end user's system when the storage medium is accessed by the system. A preferred embodiment of such a decoding algorithm is shown in the flow chart of FIG. 7. Alternatively, the decoding software may be in ROM. The algorithm is similar to the regeneration operation described above in that the audio data is decoded by multiplying each encoded data value by its absolute value to thereby closely reproduce the original sample. If the LSB of the encoded data is "0", then the data represents an exact value and is used as is. If the LSB is "1", the data represents a delta value and is added to the previous decoded sample to obtain the present decoded sample. Once decoded, the sample is then converted to analog by a digital-to-analog converter and communicated to the listener through the audio components of the destination system 106. The decoding algorithm preferably operates in real time.

If the destination system 106 is in accord with the above-incorporated patent applications, then the decoding algorithm preferably is in the form of software present in the system ROM (or loaded into the system from CD-ROM), and is downloaded to the digital signal processor (DSP) instruction memory described in such applications. Encoded input samples are read from the CD-ROM into system memory prior to decoding, and then fed sequentially (and/or with loops) to the DSP via a DSP input FIFO. The instructions in the DSP instruction memory perform the decoding operation on the incoming samples in the manner described above, using the multiplier in the DSP to perform the sample self-multiplications, and the ALU to perform the additions when needed. The downloaded DSP instructions to accomplish decoding are set forth in Appendix A & B in both assembler code and binary.

Figure 8:
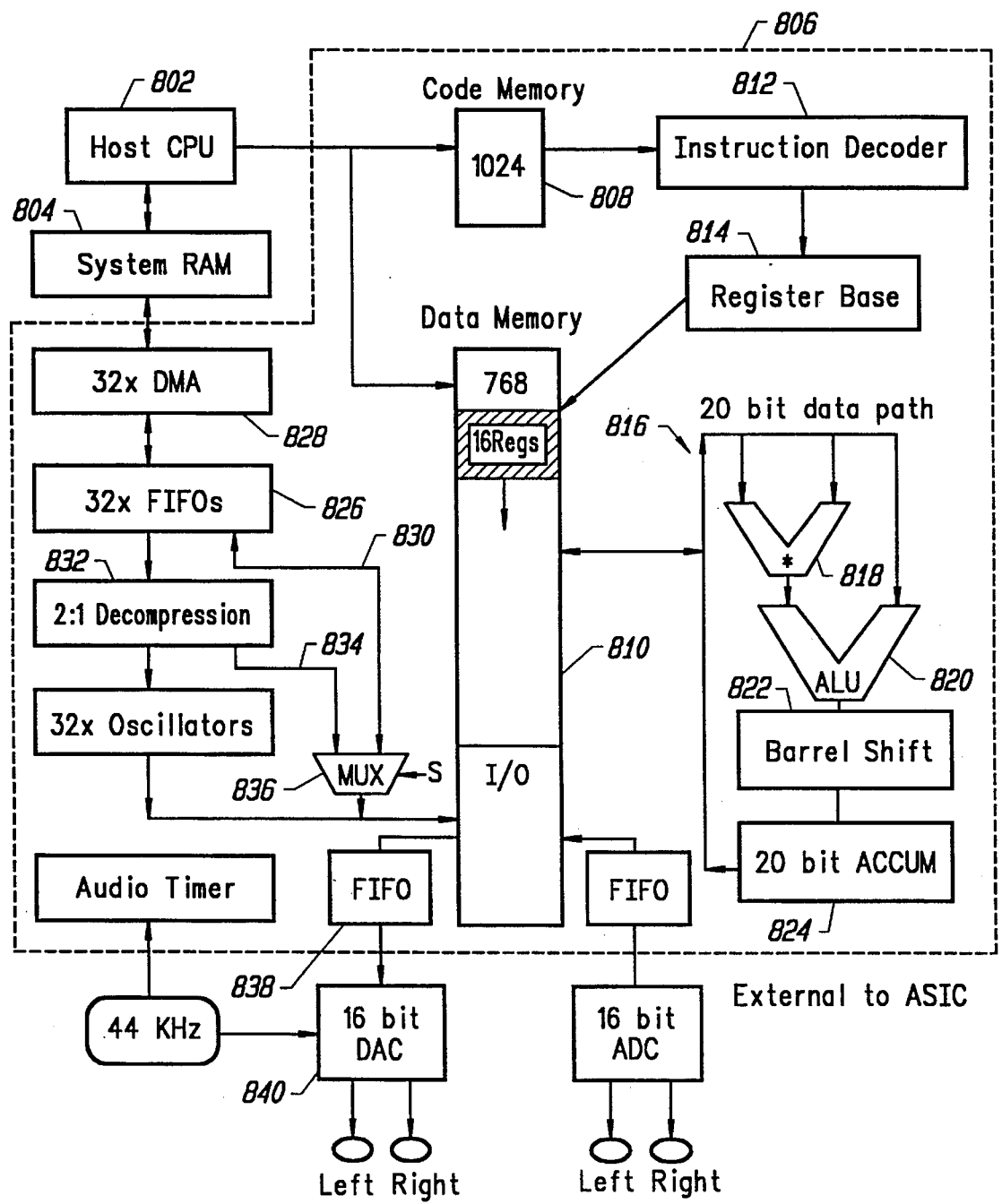
FIGS. 8 and 9 are block diagrams of hardware for implementation of the decoding software according to the present invention.
Figure 9:
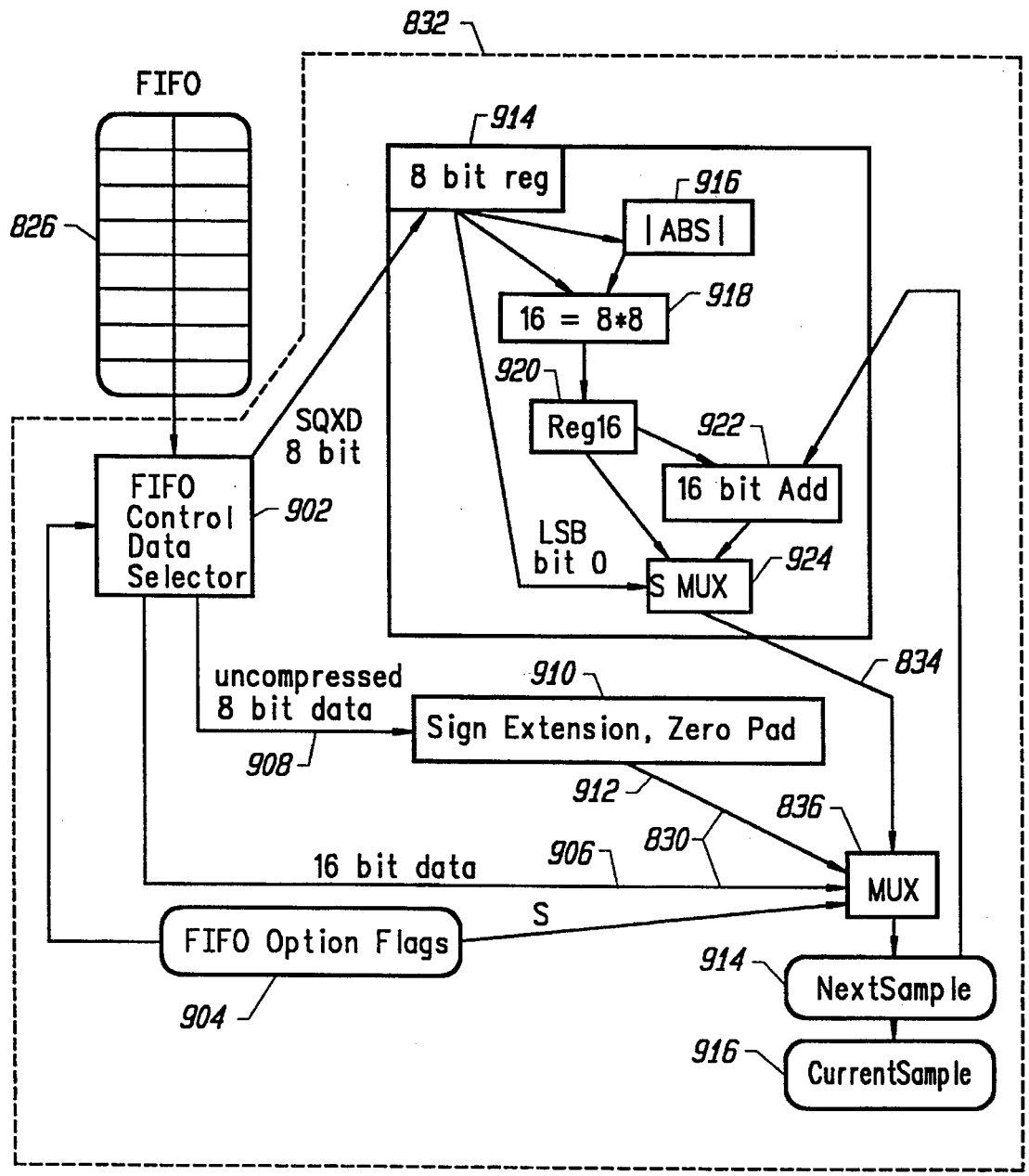

FIGS. 8 and 9 illustrate a block-diagram of an all-hardware embodiment of the decoder in destination system 106. The host CPU is illustrated as 802 and the system memory is illustrated as 804. 806 is a digital signal processor which includes hardware circuitry for decoding signals encoded according to encoding algorithm described herein.

The DSP 806 includes instruction memory (code memory) 808 and data memory 810. It also includes an instruction decoder 812 and a register base 814 for pointing into the data memory 810. Arithmetic operations take place in a data path apparatus 816, which includes a multiplier 818, an ALU 820, a barrel shifter 822, and a 20-bit accumulator 824. Incoming encoded audio samples are transmitted from the system memory 804 to FIFOs 826 by DMA circuits 828. These samples can either be written directly into registers in the data memory 810 via data path 830, or can be decompressed by hardware decompression circuitry 832 and written into the data memory 810 via data path 834. A multiplexer 836 (shown in more detail in FIG. 9) selects between data paths 830 and 834 for presentation to the data memory 810. The selection made by multiplexer 836 is made on the basis of a selection bit S, which is written by the host CPU 802. The DSP 806 computes output samples on the basis on the incoming audio samples provided via the multiplexer 836, in response to instruction code in code memory 808. And an output FIFO 838 outputs the sample to an external digital-to-analog converter (DAC) 840.

FIG. 9 shows the detail of the 2:1 decompression circuitry 832 in combination with the multiplexer 836, in FIG. 8. Referring to FIG. 9, a FIFO controlled data selector 902 controls the retrieval of input samples from the FIFO 826. These samples can arrive either as 8-bit samples compressed in the manner described herein, or as uncompressed 8-bit data, or as uncompressed to 16-bit data. The host CPU 802 programs FIFO option flags 904 to indicate which type of input samples are to be expected. If full uncompressed 16-bit data is expected, then the FIFO controlled data selector retrieves 16-bit samples and transmits them via a data path 906 to the multiplexer 836. If the incoming data is in uncompressed 8-bit format, then the FIFO controlled data selector 902 transmits them via path 908 to sign extension/0 pad circuitry 910, the output of which is provided to multiplexer 836 via data path 912.

If the incoming data is in 8-bit form, compressed according to the techniques described above, the FIFO controlled data selector transmits an incoming 8-bit value to an 8-bit register 914. The output of the register 914 is connected to the input of absolute value circuitry 916, as well as to one input of an 8-bit by 8-bit multiplier 918. The other input of the 8-bit by 8-bit multiplier 918 is connected to receive the output of the absolute value circuitry 916. The output of multiplier 918 is registered in 16-bit register 920, the output of which is provided to both one input of a 16-bit adder 922, and one input of a multiplexer 924. The select input of multiplexer 924 is the LSB of the 8-bit register 914. The output of multiplexer 924 is connected via data path 934 to an input port of multiplexer 836. Thus the multiplexer 836 is the same as the multiplexer 836 in FIG. 8, except that data path 830 in FIG. 8 is actually carried on two separate optional data paths 906 and 912 as shown in the greater detail of FIG. 9.

The output of multiplexer 836 is provided to the input of the next sample register 914, the output of which is provided to both a current sample register 916, and also to the second input of 16-bit adder 922. The output of the adder 922 is connected to the second input of multiplexer 924. The current sample register 916 is the next (t+1) output of the 2:1 decompression circuitry 832, and is provided to the data memory 810 (FIG. 8).

In operation, when a compressed value is received, the FIFO controlled data selector 902 writes it into the 8-bit register 914. The multiplier 918 multiplies the value by its own absolute value, creating a 16-bit result which is stored in register 920. If the LSB of the input sample (in register 914) was 0, then the sample represents an exact value (as opposed to a delta value). Thus in this situation, multiplexer 924 selects the output of register 920 directly for the data path 834. Alternatively, if the LSB of the sample in register 914 is 1, then the sample value represents a delta value. In this situation, the multiplexer 924 selects the output of adder 922, which is then the sum of the delta value and the prior decoded value as then contained in the register 914. Thus it can be seen that the decompression circuitry of FIG. 9 provides a full decompressed value to the data memory 810 (FIG. 8). No accommodation need be made in the DSP instructions in code memory 808 in order to utilize compressed audio input samples as opposed to fully decompressed audio input samples.

Note that each of the input values is an element of a "starting value space", defined in the present embodiment as all values which can be represented in a 16-bit binary word. The transmitted values are each in one of two predefined "transmit value spaces." That is, for exact values, the transmitted values are in a transmit value space defined as all values which can be represented in an 8-bit binary word having an LSB of 0. For delta values, the transmitted values are in a transmit value space defined as all values which can be represented in an 8-bit binary word having an LSB of 1.

Therefore, the square root function of an exact value, together with the selection of the next higher or next lower 8-bit value whose low order bit is 0, essentially defines a mapping from the starting value space to the first (exact) transmit value space. Similarly, the square root function of a delta value, together with the selection of the next higher or next lower 8-bit value whose low order bit is 1, essentially defines a mapping from the starting value space to the second (delta) transmit value space. The low order bit of the transmitted 8-bit value indicates to the destination system 106 which transmit value space the value is in, and therefore also indicates how to de-map the value back into the starting value space (representing the original value).

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

-40-

APPENDIX A

```
\ $Id: dcsqxdmono.ins,v 1.6 1994/05/12 00:00:19 peabody Exp phil $
\ DCSQXDMONO.INS
\ DeCompress SQuare eXact/Delta MONOphonic sample
\
\ 930420 PLB Fix reference to InFIFO, was FIFOInO !!
\
\ By:  Phil Burk, with Steve Hayes
\ Copyright 3DO 1992 include? DFID_DCSQXDMONO function_ids.j anew task-dcsqxdmono.ins

_RED
dspp{
ins{ dspp-echo on
DFID_DCSQXDMONO dspp- function- id !
$" dcsqxdmono.dsp" ins-name !

ALLOC.INFIFO   InFIFO
ALLOC.IMEM dc_accum   \ accumulate sample
ALLOC.IMEM dc_toggle  \ are we on odd or even byte
ALLOC.IMEM dc_hold    \ hold sample from FIFO
ALLOC.IMEM dc_byte    \ byte shifted hi
ALLOC.IMEM dc_square  \ x*ABS(x)
ALLOC.OUTPUT Output
0 $ 7FFF $ 7FFF ALLOC.KNOB Amplitude
42 ALLOC.TICKS InFIFO FIFOSTATUS+ _A #$ 0000 _+     \ address of FIFO status _BEQ: NODATA                          \ branch to be offset \       _____
        dc_toggle _%A #$ 8000 _+    \ alternate between neg and pos
        _BMI: GetNewSamp
\ Process held sample
        dc_byte _A _= dc_hold _A 8 _<<' _TRL \ shift into high position
        _JUMP: Decode _LABEL: GetNewSamp
        dc_hold _A _= InFIFO _A _TRL \ get 16 bits from FIFO \ 930420
        dc_byte _A _= ACCUME #$ FF00 _AND   \ mask off high byte _LABEL: Decode
        ACCUME _TRA \ take absolute value
        _BGE: PosByte
        _NOP          \ needed cuz next instruction is one word
        ACCUME _NEG \ negate if negative _LABEL: PosByte
        dc_square _A _= ACCUME dc_byte _A _*    \ square data value
        dc_byte _A #$ 0100 _AND                 \ odd or even ?
        _BEQ: ExactMode
```

-41-

```
\ Delta mode, use previous_sample + x*|x| as the next sample
        dc_square _A        dc_accume _%A _CLIP _+
        _JUMP:  AllDone \ Exact mode, use x*|x| as the next sample
_LABEL: ExactMode
        dc_accum _A _= dc_square _A _TRL
_LABEL: AllDone
        _NOP
\ _____

Output _A _= ACCUME Amplitude _A _* \ to Mixer

_LABEL: NODATA
}ins
}dspp
```

-42-

APPENDIX B rhett 110% gmake dcsqxdmono.dsp
```
/usr/local/bin/forth dsppasm.dic dcsqxdmono.ins
# InFIFO FIFOSTATUS+ _A #$ 0000 _+     \ address of FIFO status
0x0000 0x4620
0x0001 0x8000
0x0002 0xc000
# _BEQ: NODATA       \ branch to be offset
0x0003 0xb400
# dc_toggle _%A #$ 8000 _+ \ alternate between neg and pos
0x0004 0x4620
0x0005 0x8800
0x0006 0xf000
# _BMI: GetNewSamp
0x0007 0xa800
# dc_byte _A _= dc_hold _A 8 _<<' _TRL \ shift into high position
0x0008 0x4486
0x0009 0x8000
0x000a 0x8000
# _JUMP: Decode
0x000b 0x8400
0x0007 0xa80c
# dc_hold _A _= InFIFO _A _TRL  \ get 16 bits from FIFO \ 930420
0x000c 0x4480
0x000d 0x8000
dspp.add.node.eni , ref = 9 , en-addr = 14 , last = 9
0x0009 0x800e
0x000e 0x8000
# dc_byte _A _= ACCUME #$ FF00 _AND \ mask off high byte
0x000f 0x41a0
0x0010 0xdf00
dspp.add.node.eni , ref = 10 , en-addr = 17 , last = 10
0x000a 0x8011
0x0011 0x8000
0x000b 0x8412
# ACCUME _TRA \ take absolute value
0x0012 0x0000
# _BGE: PosByte
0x0013 0xe800
# _NOP \ needed cuz next instruction is one word
0x0014 0x8000
# ACCUME _NEG \ negate if negative
0x0015 0x0010
0x0013 0xe816
# dc_square _A _= ACCUME dc_byte _A _* \ square data value
0x0016 0x4c80
dspp.add.node.eni , ref = 10 , en-addr = 23 , last = 17
0x0011 0x8017
0x0017 0x8000
0x0018 0x8000
# dc_byte _A #$ 0100 _AND \ odd or even ?
0x0019 0x46a0
dspp.add.node.eni , ref = 10 , en-addr = 26 , last = 23
0x0017 0x801a
0x001a 0x8000
0x001b 0xc100
# _BEQ: ExactMode
0x001c 0xb400
```

-43-

```
# dc_square _A dc_accum _%A _CLIP _+
0x001d 0x4627
dspp.add.node.eni , ref = 24 , en-addr = 30 , last = 24
0x0018 0x801e
0x001e 0x8000
0x001f 0x8800
# _JUMP: AllDone
0x0020 0x8400
0x001c 0xb421
# dc_accum _A _- dc_square _A _TRL
0x0021 0x4480
dspp.add.node.eni , ref = 24 , en-addr = 34 , last = 30
0x001e 0x8022
0x0022 0x8000
dspp.add.node.eni , ref = 31 , en-addr = 35 , last = 31
0x001f 0x8823
0x0023 0x8000
0x0020 0x8424
# _NOP
0x0024 0x8000
# Output _A _= ACCUME Amplitude _A _* \ to Mixer
0x0025 0x4c80
0x0026 0x8000
0x0027 0x8000
0x0003 0xb428
Output written to: output.dsp
Begin FORM=3INS
Name == dcsqxdmono.dsp
Now writing chunk: NAME 14
          0 \/ 2  3  4  5  6  7  8  9  a  b  c  d  e  f     0v23456789abcdef
37e30    0e 64 63 73 71 78 64 6d 6f 6e 6f 2e 64 73 70 00    .dcsqxdmono.dsp.
# }ins
0x0028 0x8380
# }ins
0x0029 0x8000
Begin FORM=DSPP
DHDR: Silicon = 2 , Function = 6
Now writing chunk: DHDR 16
          0  1  2  3  4  5  6  7  8  9  a  b \/ d  e  f     0123456789abvdef
30de0    64 72 2d 64 61 74 61 00 00 00 01 2f 00 00 00 06    dr-data..../....
30df0    00 00 00 02 00 00 00 00 00 00 00 00 00 03 0d d8    ...............X
42 == CodeSize
Now writing chunk: DCOD 96
          0  1  2  3  4  5  6  7  8  9  a  b \/ d  e  f     0123456789abvdef
37ff0    00 00 00 00 00 00 00 33 37 66 36 36 00 00 00 00    .......37f00....
38000    00 00 00 0c 00 00 00 2a 46 20 80 00 c0 00 b4 28    .......*F..@.4(
38010    46 20 88 00 f0 00 a8 0c 44 86 80 0e 80 11 84 12    F..p.(.D........
38020    44 80 80 00 80 00 41 a0 df 00 80 17 00 00 e8 16    D....A........h.
38030    80 00 00 10 4c 80 80 1a 80 1e 46 a0 80 00 c1 00    ....L.....F...A.
38040    b4 21 46 27 80 22 88 23 84 24 44 80 80 00 80 00    4!F'.".#.$D.....
38050    80 00 4c 80 80 00 80 00 83 80 80 00 00 00 00 00    ..L.............

Name: dc_square
References:
        18 = 801e
        1e = 8022
        22 = 8000
ofx.add.rloc: 0 2 10 0 0 24
ofx.add.pre.rsrc : 2 1 dc_square 0
```

-44-

```
Name: dc_byte
References:
a = 8011
11 = 8017
17 = 801a
1a = 8000
ofx.add.rloc: 0 2 10 0 1 10
ofx.add.pre.rsrc : 2 1 dc_byte 0

Name: dc_hold
References:
        9 = 800e
        e = 8000
ofx.add.rloc: 0 2 10 0 2 9
ofx.add.pre.rsrc : 2 1 dc_hold 0

Name: dc_toggle
References:
        5 = 8800
ofx.add.rloc: 0 2 10 0 3 5
ofx.add.pre.rsrc : 2 1 dc_toggle 0

Name: dc_accum
References:
        1f = 8823
        23 = 8000
ofx.add.rloc: 0 2 10 0 4 31
ofx.add.pre.rsrc : 2 1 dc_accum 0

Name: Output
References:
        27 = 8000
ofx.add.rloc: 0 2 10 0 5 39
ofx.add.pre.rsrc : 2 1 Output 0

Input FIFOs:InFIFO
Normal:
        d = 8000
Status:
        1 = 8000
Read :
ofx.add.rloc: 0 2 10 0 6 13
ofx.add.rloc: 1 2 10 0 6 1
ofx.add.pre.rsrc : 6 1 InFIFO 0

Name: Amplitude
References:
        26 = 8000
ofx.add.rloc: 0 2 10 0 7 38
ofx.add.pre.rsrc : 1 1 Amplitude 0
6 branches:
7
b
13
1c
20
ofx.add.rloc: 0 1 10 0 8 3
ofx.add.rloc: 0 1 10 0 8 7
ofx.add.rloc: 0 1 10 0 8 11
ofx.add.rloc: 0 1 10 0 8 19
```

-45-

```
ofx.add.rloc: 0 1 10 0 8 28
ofx.add.rloc: 0 1 10 0 8 32
ofx.add.pre.rsrc : 0 42 Entry 0
42 == Ticks
ofx.add.pre.rsrc : 8 42 Ticks 0
Now writing chunk: DRSC 160
        0  1  2  3 \/ 5  6  7  8  9  a  b  c  d  e  f  0123v56789abcdef
2da50  00 00 07 d0 00 00 00 02 00 00 00 01 00 00 00 00  ...P............
2da60  00 00 00 00 00 00 00 02 00 00 00 01 00 00 00 00  ................
2da70  00 00 00 00 00 00 00 02 00 00 00 01 00 00 00 00  ................
2da80  00 00 00 00 00 00 00 02 00 00 00 01 00 00 00 00  ................
2da90  00 00 00 00 00 00 00 02 00 00 00 01 00 00 00 00  ................
2daa0  00 00 00 00 00 00 00 02 00 00 00 01 00 00 00 00  ................
2dab0  00 00 00 00 00 00 00 06 00 00 00 01 00 00 00 00  ................
2dac0  00 00 00 00 00 00 00 01 00 00 00 01 00 00 00 00  ................
2dad0  00 00 00 00 00 00 00 00 00 00 00 2a 00 00 00 00  ...........*....
2dae0  00 00 00 00 00 00 00 08 00 00 00 00 2a 00 00 00  ............*...
2daf0  00 00 00 00 00 00 00 00 00 00 07 d0 07 95 09 4c  ...........P...L
Now writing chunk: DRLC 240
        0  1  2  3 \/ 5  6  7  8  9  a  b  c  d  e  f  0123v56789abcdef
2e240  00 00 07 d0 00 02 0a 00 00 00 00 00 00 00 00 00  ....P...........
2e250  00 00 00 18 00 02 0a 00 00 00 00 00 00 00 00 01  ................
2e260  00 00 00 0a 00 02 0a 00 00 00 00 00 00 00 00 02  ................
2e270  00 00 00 09 00 02 0a 00 00 00 00 00 00 00 00 03  ................
2e280  00 00 00 05 00 02 0a 00 00 00 00 00 00 00 00 04  ................
2e290  00 00 00 1f 00 02 0a 00 00 00 00 00 00 00 00 05  ................
2e2a0  00 00 00 27 00 02 0a 00 00 00 00 00 00 00 00 06  ...'............
2e2b0  00 00 00 0d 01 02 0a 00 00 00 00 00 00 00 00 06  ................
2e2c0  00 00 00 01 00 02 0a 00 00 00 00 00 00 00 00 07  ................
2e2d0  00 00 00 26 00 01 0a 00 00 00 00 00 00 00 00 08  ...&............
2e2e0  00 00 00 03 00 01 0a 00 00 00 00 00 00 00 00 08  ................
2e2f0  00 00 00 07 00 01 0a 00 00 00 00 00 00 00 00 08  ................
2e300  00 00 00 0b 00 01 0a 00 00 00 00 00 00 00 00 08  ................
2e310  00 00 00 13 00 01 0a 00 00 00 00 00 00 00 00 08  ................
2e320  00 00 00 1c 00 01 0a 00 00 00 00 00 00 00 00 08  ................
2e330  00 00 00 20 00 02 bb 14 00 00 00 25 00 00 00 0a  ... .......%....
Now writing chunk: DNMS 81
        0  1  2  3  4  5  6  7 \/ 9  a  b  c  d  e  f  01234567v9abcdef
2ea30  00 00 00 51 00 00 07 d0 64 63 5f 73 71 75 61 72  ...Q....Pdc_squar
2ea40  65 00 64 63 5f 62 79 74 65 00 64 63 5f 68 6f 6c  e.dc_byte.dc_hol
2ea50  64 00 64 63 5f 74 6f 67 67 6c 65 00 64 63 5f 61  d.dc_toggle.dc_a
2ea60  63 63 75 6d 00 4f 75 74 70 75 74 00 49 6e 46 49  ccum.Output.InFI
2ea70  46 4f 00 41 6d 70 6c 69 74 75 64 65 00 45 6e 74  FO.Amplitude.Ent
2ea80  72 79 00 54 69 63 6b 73 00 02 e7 fc 00 00 00 71  ry.Ticks..g|...q
Now writing chunk: DKEE3 68
        0  1  2  3  4  5  6  7 \/ 9  a  b  c  d  e  f  01234567v9abcdef
2f220  00 00 00 44 00 00 07 d0 00 00 00 00 00 00 00 00  ...D....P.......
2f230  00 00 7f ff 00 00 7f ff 00 00 00 01 41 6d 70 6c  ............Ampl
2f240  69 74 75 64 65 00 00 00 00 00 00 00 00 00 00 00  itude...........
2f250  00 00 00 00 00 00 00 00 00 00 00 00 00 00 00 07  ................
2f260  00 00 00 00 00 00 00 00 00 00 00 00 00 00 00 04  ................
End FORM
End FORM
/bin/mv output.dsp dcsqxdmono.dsp
```

We claim:

1. A method for communicating a plurality of starting values $s_i$ over a transmission medium, $i=0, 1, 2, \ldots$, all of said starting values $s_i$ being in a starting value space, comprising the steps of, for each of at least two i'th starting values $s_i$:

calculating a transmission value $y_i$ given by $y_i=f_i(s_i)$, where the value $f_i(s_i)$ is selected depending on a selection decision from a predefined group of candidate values including $e_1(s_i)$ and $d_1(s_i-f^{-1}_{i-1}(f_{i-1}(s_{i-1})))$, where the function $e_1(\ )$ is a predefined mapping from said starting value space to a first transmission value space, and where the function $d_1(\ )$ is a predefined mapping from said starting value space to a second transmission value space said first and second transmission value spaces containing discrete values; and transmitting over said transmission medium said transmission value $y_i$ in conjunction with an indication of whether $y_i$: (a) is a function of $s_i$ and not of $f^{-1}_{i-1}(f_{i-1}(s_{i-1}))$, or (b) is a function of $s_i-f^{-1}_{i-1}(f_{i-1}(s_{i-1}))$;

wherein the function $e_1(\ )$ is defined by $e_1(s)=\text{sign}(s)*|s|^{1/n}$, rounded to the nearest discrete value in said first transmission value space, and the function $d_1(\ )$ is defined by $d_1(s)=\text{sign}(s)*|s|^{1/n}$, rounded to the nearest discrete value in said second transmission value space, n being an integer greater than 1.

2. A method for communicating a plurality of starting values $s_i$ over a transmission medium, $i=0, 1, 2, \ldots$, all of said starting values $s_i$ being in a starting value space, comprising the steps of, for each of at least two i'th starting values $s_i$:

calculating a transmission value $y_i$ given by $y_i=f_i(s_i)$, where the value $f_i(s_i)$ is selected depending on a selection decision from a predefined group of candidate values including $e_1(s_i)$ and $d_1(s_i-f^{-1}_{i-1}(f_{i-1}(s_{i-1})))$, where the function $e_1(\ )$ is a predefined mapping from said starting value space to at first transmission value space, and where the function $d_1(\ )$ is a predefined mapping from said starting value space to a second transmission value space said first and second transmission value spaces containing discrete values; and transmitting over said transmission medium said transmission value $y_i$ in conjunction with an indication of whether $y_i$: (a) is a function of $s_i$ and not of $f^{-1}_{i-1}(f_{i-1}(s_{i-1}))$, or (b) is a function of $s_i-f^{-1}_{i-1}(f_{i-1}(s_{i-1}))$;

wherein the function $e_1(\ )$ is defined by $e_1(s)=\text{sign}(s)*|s|^{1/2}$, rounded to the nearest discrete value in said first transmission value space, and the function $d_1(\ )$ is defined by $d_1(s)=\text{sign}(s)*|s|^{1/2}$, rounded to the nearest discrete value in said second transmission value space.

3. A method for communicating a plurality of starting values $s_i$ over a transmission medium, $i=0, 1, 2, \ldots$, all of said starting values $s_i$ being in a starting value space, comprising the steps of, for each of at least two i'th starting values $s_i$:

calculating a transmission value $y_i$ given by $y_i=f_i(s_i)$, where the value $f_i(s_i)$ is selected depending on a selection decision from a predefined group of candidate values including $e_1(s_i)$ and $d_1(s_i-f^{-1}_{i-1}(f_{i-1}(s_{i-1})))$, where the function $e_1(\ )$ is a predefined mapping from said starting value space to a first transmission value space, and where the function $d_1(\ )$ is a predefined mapping from said starting value space to a second transmission value space said first and second transmission value spaces containing discrete values; and transmitting over said transmission medium said transmission value $y_i$ in conjunction with an indication of whether $y_i$: (a) is a function of $s_i$ and not of $f^{-1}_{i-1}(f_{i-1}(s_{i-1}))$, or (b) is a function of $s_i-f^{-1}_{i-1}(f_{i-1}(s_{i-1}))$;

wherein said selection decision selects the value $f_i(s_i)$ as whichever of the candidate values in said group of candidate values minimizes $|s_i-f_i^{-1}(f_i(s_i))|$.

4. A method for communicating a plurality of starting values $s_i$ over a transmission medium, $i=0, 1, 2, \ldots$, all of said starting values $s_i$ being in a starting value space, comprising the steps of, for each of at least two i'th starting values $s_i$:

calculating a transmission value $y_i$ given by $y_i=f_i(s_i)$, where the value $f_i(s_i)$ is selected depending on a selection decision from a predefined group of candidate values including $e_1(s_i)$ and $d_1(s_i-f^{-1}_{i-1}(f_{i-1}(s_{i-1})))$, where the function $e_1(\ )$ is a predefined mapping from said starting value space to a first transmission value space, and where the function $d_1(\ )$ is a predefined mapping from said starting value space to a second transmission value space said first and second transmission value spaces containing discrete values; and transmitting over said transmission medium said transmission value $y_i$ in conjunction with an indication of whether $y_i$: (a) is a function of $s_i$ and not of $f^{-1}_{i-1}(f_{i-1}(s_{i-1}))$, or (b) is a function of $s_i-f^{-1}_{i-1}(f_{i-1}(s_{i-1}))$;

wherein said first transmission value space is the space of all 8-bit values having a low order bit of 0, wherein said second transmission value space is the space of all 8-bit values having a low order bit of 1, and wherein said indication of whether $y_i$: (a) is a function of $s_i$ and not $f^{-1}_{i-1}(f_{i-1}(s_{i-1}))$, or (b) is a function of $s_i-f^{-1}_{i-1}(f_{i-1}(s_{i-1}))$, comprises the low order bit of $y_i$.

5. A method for communicating a plurality of starting values $s_i$ over a transmission medium, $i=0, 1, 2, \ldots$, all of said starting values $s_i$ being in a starting value space, comprising the steps of, for each of at least two i'th starting values $s_i$:

calculating a transmission value $y_i$ given by $y_i=f_i(s_i)$, where the value $f_i(s_i)$ is selected depending on a selection decision from a predefined group of candidate values including $e_1(s_i)$ and $d_1(s_i-f^{-1}_{i-1}(f_{i-1}(s_{i-1})))$, where the function $e_1(\ )$ is a predefined mapping from said starting value space to a first transmission value space, and where the function $d_1(\ )$ is a predefined mapping from said starting value space to a second transmission value space said first and second transmission value spaces containing discrete values; and transmitting over said transmission medium said transmission value $y_i$ in conjunction with an indication of whether $y_i$: (a) is a function of $s_i$ and not of $f^{-1}_{i-1}(f_{i-1}(s_{i-1}))$, or (b) is a function of $s_i-f^{-1}_{i-1}(f_{i-1}(s_{i-1}))$;

wherein said group of candidate values further includes values $e_2(s_i)$ and $d_2(s_i-f^{-1}_{i-1}(f_{i-1}(s_{i-1})))$, where, for a predefined function $g(\ )$:

the value $e_1(s)=g(s)$ rounded to the next lower discrete value in said first transmission value space;

the value $e_2(s)=g(s)$ rounded to the next higher discrete value in said first transmission value space;

the value $d_1(s)]=g(s)$ rounded to the next lower discrete value in said second transmission value space; and the value $d_2(s)]=g(s)$ rounded to the next higher discrete value in said second transmission value space.

6. A method according to claim 5, wherein $g(s)=\text{sign}(s)*|s|^{1/n}$, n being an integer greater than 1.

7. A method according to claim 5, wherein $g(s)=\text{sign}(s)*|s|^{1/2}$.

8. A method according to claim 5, wherein said selection decision selects the value $f_i(s)$ as whichever of said candidate values minimizes $|s_i - f_i^{-1}(f_i(s_i))|$.

9. A method according to claim 5, wherein said selection decision selects the value $f_i(s)$ by determining the one of said candidate values $f_i(s)$ and the one of said candidate values $f_{i+1}(s)$ which together minimize $[s_i - f_i^{-1}(f_i(s_i))]^2 + [s_{i+1} - f_{i+1}^{-1}(f_{i+1}(s_{i+1}))]^2$.

10. A method for communicating a plurality of starting values $s_i$ over a transmission medium, $i=0, 1, 2, \ldots$, comprising the steps of:

calculating a value $y_i = \text{sign}(s_i)*|s_i|^{1/n}$ for each i, n being an integer greater than 1; and transmitting over said transmission medium values responsive to said $y_i$.

11. A method according to claim 10, for use with a plurality of input values $x_i$ each corresponding to a respective one of said starting values $s_i$, wherein said step of transmitting comprises the step of transmitting over said transmission medium a respective value responsive to each of said $y_i$, further comprising the step of performing one of the following steps selectively for each $s_i$:

(a) setting $s_i$ equal to the corresponding $x_i$; and (b) setting $s_i$ equal to the difference between $x_i$ and an inverse function of the value transmitted over said transmission medium in response to $y_{i-1}$, selectably in dependence on a selection decision.

12. A method according to claim 10, further comprising a step of mapping each of said $y_i$ to an element in a transmission value space selected from a plurality of predefined transmission value spaces, wherein said step of transmitting comprises a step of transmitting over said transmission medium both the mapped $y_i$ and an indication of the transmission value space selected for $y_i$.

13. A method for decoding a plurality of transmission values $y_i$ received over a transmission medium, $i=0, 1, 2, \ldots$, comprising the steps of:

receiving each of said transmission values $y_i$ in conjunction with an indication of whether $y_i$: (a) is a function of $s_i$ and not $f^{-1}_{i-1}(f_{i-1}(s_{i-1}))$, or (b) is a function of $s_i - f^{-1}_{i-1}(f_{i-1}(s_{i-1}))$, where each of the $s_i$ are starting values to be reconstructed; and calculating a reconstructed value $s'_i$ for each $y_i$ as $s'_i = g^{-1}(y_i)$ if $y_i$ is a function of $s_i$ and not $f^{-1}_{i-1}(f_{i-1}(s_{i-1}))$, and calculating a reconstructed value $s'_i$ for each $y_i$ as $s'_i = s'_{i-1} + g^{-1}(y_i)$ if $y_i$ is a function of $s_i - f^{-1}_{i-1}(f_{i-1}(s_{i-1}))$, wherein the function $g^{-1}(\ ) = \text{sign}(y)*|y|^n$, n being a predefined integer greater than 2.

14. A method for decoding a plurality of transmission values $y_i$ received over a transmission medium $i=0, 1, 2, \ldots$, comprising the steps of, for $i>0$;

receiving each of said transmission values $y_i$ in conjunction with an indication of whether $y_i$: (a) is a function of $s_i$ and not $f^{-1}_{i-1}(f_{i-1}(s_{i-1}))$, or (b) is a function of $s_i - f^{-1}_{i-1}(f_{i-1}(s_{i-1}))$, where each of the $s_i$ are starting values to be reconstructed; and calculating a reconstructed value $s'_i$ for each $y_i$ as $s'_i = g^{-1}(y_i)$ if $y_i$ is a function of $s_i$ and not $f^{-1}_{i-1}(f_{i-1}(s_{i-1}))$, and calculating a reconstructed value $s'_i$ for each $y_i$ as $s'_i = s'_{i-1} + g^{-1}(y_i)$ if $y_i$ is a function of $s_i - f^{-1}_{i-1}(f_{i-1}(s_{i-1}))$, wherein the function $g^{-1}(\ ) = \text{sign}(y)*y^2$.

15. A method for decoding a plurality of transmission values $y_i$ received over a transmission medium, $i=0, 1, 2, \ldots$, comprising the steps of, for $i>0$:

receiving each of said transmission values $y_i$; and calculating a value $z_i$ for each of said $y_i$, where for each i, $z_i = \text{sign}(y_i)*|y_i|^n$, n being a predetermined integer greater than 1.

16. A method according to claim 15, wherein $n=2$.

17. A method according to claim 15, wherein $n=3$.

18. A method according to claim 15, further comprising the steps of:

receiving in conjunction with each of said $y_i$ an indication of whether $y_i$ is a function of $s_i$ and not of the difference between $s_i$ and a reconstruction of an encoded version of $s_{i-1}$, or is a function of the difference between $s_i$ and a reconstruction of an encoded version of $s_{i-1}$, each of the $s_i$ being starting values to be reconstructed; and determining a reconstructed value $s'_i$ for each $y_i$ as $s'_i = z_i$ if $y_i$ is a function of $s_i$ and not of the difference between $s_i$ and a reconstruction of an encoded version of $s_{i-1}$, and as $s'_i = s'_{i-1} + z_i$ if $y_i$ is a function of the difference between $s_i$ and a reconstruction of an encoded version of $s_{i-1}$.

\* \* \* \* \*